US012202225B2

(12) United States Patent
Cheich et al.

(10) Patent No.: US 12,202,225 B2
(45) Date of Patent: Jan. 21, 2025

(54) DUNNAGE CONVERSION MACHINE, METHOD, AND PRODUCT WITH A POLYGONAL CROSS-SECTION

(71) Applicant: Ranpak Corp., Concord Township, OH (US)

(72) Inventors: Robert C. Cheich, Independence, OH (US); Dennis Wagner, Painesville, OH (US)

(73) Assignee: Ranpak Corp., Concord Township, OH (US)

( * ) Notice: Subject to any disclaimer, the term of this patent is extended or adjusted under 35 U.S.C. 154(b) by 146 days.

(21) Appl. No.: 18/058,558

(22) Filed: Nov. 23, 2022

(65) Prior Publication Data

US 2023/0109548 A1 Apr. 6, 2023

Related U.S. Application Data

(62) Division of application No. 16/491,994, filed as application No. PCT/US2018/020667 on Feb. 28, 2018, now Pat. No. 11,541,621.

(Continued)

(51) Int. Cl.
*B31D 5/00* (2017.01)
*B65D 81/05* (2006.01)

(52) U.S. Cl.
CPC ......... *B31D 5/0047* (2013.01); *B31D 5/0052* (2013.01); *B31D 2205/0047* (2013.01);
(Continued)

(58) Field of Classification Search
CPC .............................. Y10S 493/967; B32B 3/24
(Continued)

(56) References Cited

U.S. PATENT DOCUMENTS 3,509,798 A 5/1970 Johnson
3,606,726 A 9/1971 Spertus et al.
(Continued)

FOREIGN PATENT DOCUMENTS

JP H0347744 A 2/1991
JP H06199365 A 7/1994
(Continued)

OTHER PUBLICATIONS

International Search Report and Written Opinion mailed May 17, 2018, for priority International Patent Application No. PCT/US2018/020067.

(Continued)

*Primary Examiner* — Praachi M Pathak
(74) *Attorney, Agent, or Firm* — Renner, Otto, Boisselle & Sklar, LLP

(57) ABSTRACT

A machine for converting a sheet material into a relatively less dense dunnage product includes a forming assembly and a feeding assembly downstream of the forming assembly. The forming assembly is configured to cause lateral edges of the sheet material to roll towards one another, forming a tubular shape. A deflector at a downstream end of the forming assembly is configured to engage the lateral edges of the sheet material and to urge the lateral edges into an interior of the tubular shape. This juxtaposes lateral edge portions of the sheet material adjacent the respective lateral edges. A forming channel at a downstream end of the forming assembly faces the deflector to receive the lateral edge portions and shape them into a tab. Finally, the feeding assembly includes rotating connecting members that engage and connect together the overlapping lateral edge portions of the sheet material forming the tab.

7 Claims, 14 Drawing Sheets

Related U.S. Application Data

(60) Provisional application No. 62/464,646, filed on Feb. 28, 2017.

(52) U.S. Cl.
CPC ................ *B31D 2205/0058* (2013.01); *B31D 2205/0064* (2013.01); *B65D 81/05* (2013.01)

(58) Field of Classification Search
USPC .................. 206/814, 521, 494; 428/132, 134
See application file for complete search history.

(56) References Cited

U.S. PATENT DOCUMENTS

| | | | | | |
|---|---|---|---|---|---|
| 4,717,613 | A | * | 1/1988 | Ottaviano | B31D 5/0047 428/129 |
| 4,750,896 | A | * | 6/1988 | Komaransky | B31D 5/0047 493/464 |
| 4,968,291 | A | | 11/1990 | Baldacci et al. | |
| 5,468,556 | A | | 11/1995 | Fuss et al. | |
| 5,643,167 | A | | 7/1997 | Simmons | |
| 5,713,825 | A | | 2/1998 | Ratzel | |
| 5,755,656 | A | | 5/1998 | Beierlorzer | |
| 6,035,613 | A | * | 3/2000 | Lencoski | B65D 81/051 53/139.5 |
| 6,090,033 | A | * | 7/2000 | Simmons, Jr. | B31D 5/0047 493/464 |
| 6,132,842 | A | | 10/2000 | Simmons, Jr. et al. | |
| 2002/0129583 | A1 | | 9/2002 | Simmons, Jr. et al. | |

FOREIGN PATENT DOCUMENTS

| | | | |
|---|---|---|---|
| JP | H10501752 | A | 2/1998 |
| JP | 2001150572 | A | 6/2001 |
| WO | 1995028276 | A1 | 10/1995 |
| WO | 2011078666 | A1 | 6/2011 |

OTHER PUBLICATIONS

Translation of Notification of Reasons for Refusal issued Oct. 27, 2020, for related Japanese National Phase Application No. 2019-547108.

* cited by examiner

DUNNAGE CONVERSION MACHINE, METHOD, AND PRODUCT WITH A POLYGONAL CROSS-SECTION

RELATED APPLICATIONS

This application is a divisional of and claims priority of U.S. patent application Ser. No. 16/491,994, filed Aug. 6, 2019, which is a national phase of International Application No. PCT/US2018/020067, filed Feb. 28, 2018 and published in the English language, and which claims priority to U.S. Application No. 62/464,646 filed Feb. 28, 2017, each of which is hereby incorporated herein by reference in its entirety.

FIELD OF THE INVENTION

The present invention relates to dunnage conversion machines, methods of converting a sheet stock material into a dunnage product, and dunnage products having a polygonal cross-section.

BACKGROUND

Dunnage products often are used to pack articles in shipping containers and thus minimize or prevent damage during shipment. During packaging for shipment, one or more items may be placed in a shipping container, such as a cardboard box. Shipping containers tend to have standardized sizes, and the items may not fill the entire volume of a shipping container. Void volume is the empty volume remaining in the shipping container after items to be shipped have been placed into the shipping container. Sometimes the items are fragile and including a properly-positioned cushioning dunnage product in the shipping container helps to prevent or minimize damage during shipment. Even more durable items can benefit from preventing or minimizing shifting of the items during shipment. For example, a book may still be readable after bouncing around inside a shipping container, but the edges and corners may be damaged and unsightly. In this situation, having a void-fill dunnage product in the void volume can prevent or minimize such cosmetic damage to a product.

Rather than producing the dunnage products in a central location and then shipping the dunnage products to the end user, it may be more efficient to ship the relatively denser stock material and then employ a dunnage conversion machine to convert the stock material into a dunnage product at or near the location where the dunnage product will be put to use. Sheet stock material, such as paper, is an exemplary stock material for conversion into a dunnage product. The sheet stock material may be provided in the form of a roll or a fan-folded stack from which a substantially continuous length of sheet stock material may be drawn for conversion into a lower density dunnage product. Dunnage products of desired lengths may be used for cushioning, void-fill, for blocking and bracing, or other packaging applications.

SUMMARY

The present invention provides a dunnage conversion machine, a method of converting a sheet stock material into a dunnage product, and a dunnage product having a polygonal cross-section, such as a triangular cross-section, that provides improved yield. Yield for a void-fill dunnage product can be measured by the volume occupied by the dunnage product for each unit of length or area of sheet stock material. The void-fill dunnage product provided by the present invention also may provide improved cushioning properties compared to other void-fill dunnage products.

The following paragraphs paraphrase the claims.

More particularly, the present invention provides a machine for converting a sheet stock material into a relatively less dense dunnage product as the sheet stock material moves in a downstream direction through the machine. Thus, the machine also may be referred to as a dunnage conversion machine, a conversion machine, a dunnage converter, or simply as a converter. The machine includes a forming assembly that defines a portion of a path for the sheet stock material through the machine in the downstream direction. The forming assembly is configured to cause lateral edges of the sheet stock material to roll towards one another to form the sheet stock material into a tubular shape. The forming assembly also includes a deflector at a downstream end of the forming assembly configured to engage the lateral edges of the sheet stock material and to urge the lateral edges inward into an interior of the tubular shape with lateral edge portions of the sheet stock material adjacent the lateral edges being brought into juxtaposition. The forming assembly further includes a forming channel at a downstream end of the forming assembly facing the deflector for receiving the lateral edge portions from the deflector and shaping them into a tab. Finally, the machine includes a feeding assembly downstream of the forming assembly. The feeding assembly includes rotating connecting members that engage and connect together the overlapping lateral edge portions of the sheet stock material forming the tab.

The forming assembly and the feeding assembly may be configured to urge portions of the sheet stock material respectively adjacent opposite sides of the tab toward the tab for passage between the rotating connecting members along with the tab, such that the adjacent portions are connected to the tab and form with the tab a ridge on one side of the tubular shape.

The machine may further include a forming plough at a downstream end of the forming assembly spaced from the deflector and the forming channel. The forming plough extends into the path of the sheet stock material to shape a side of the tubular shape between the forming assembly and the feeding assembly.

The forming plough may have a central portion and lateral side wings angled relative to the central portion to facilitate guiding the sheet stock material toward the feeding assembly.

The forming assembly may include an external forming member having interior side surfaces that converge towards one another going in the downstream direction, and the converging side surfaces may cause the side portions of the sheet stock material to randomly crumple as the sheet stock material passes through the forming assembly.

The external forming member may be in the form of a converging chute having converging side walls forming the converging side surfaces.

The deflector may be mounted to extend inwardly from an interior surface of the external forming member.

The forming assembly may include an internal forming member extending into the external forming member and around which the lateral edges of the sheet stock material wrap as the sheet stock material moves downstream through the forming assembly.

The internal forming member may be spaced inwardly from the interior side surfaces to constrain movement of the sheet stock material therebetween along a portion of the path for the sheet stock material.

The forming channel may be incorporated into an exterior surface of the internal forming member.

The machine may include at least one of (a) the deflector and the forming channel may be coextensive, (b) the deflector may extend into the forming channel, and (c) the deflector and the forming channel may extend in a downstream direction.

The machine may further include a severing assembly downstream of the feeding assembly that includes a pair of rollers configured to engage the sheet stock material therebetween and to rotate the rollers at a faster speed than the feeding assembly to tear the sheet stock material at a line of perforation.

The present invention also provides a dunnage product made from a sheet stock material formed into a tube having at least three planar sides giving the tube a polygonal cross-sectional shape, where the planar sides of the tube are crumpled and adjacent planar sides are joined at respective vertices of the polygonal cross-sectional shape, and where lateral edge portions of the sheet stock material are connected together to form a ridge disposed along one of the vertices. The ridge may have a stiffness greater than the stiffness of those portions of the sheet stock material not forming the ridge.

The present invention also provides a method for converting a sheet stock material into a relatively less dense dunnage product as the sheet stock material moves in a downstream direction. The method includes the following steps: (a) rolling lateral edges of the sheet stock material towards one another to form the sheet stock material into a tubular shape; (b) engaging the lateral edges of the sheet stock material and urging the lateral edges to turn inwardly into an interior of the tubular shape; (c) bringing the lateral edges and adjacent lateral edge portions of the sheet stock material into juxtaposition; (d) shaping the lateral edge portions into a tab that protrudes into an interior of the tubular shape; and (e) connecting the lateral edge portions of the sheet stock material forming the tab.

The shaping step may include gathering outer portions of the sheet material outside the tab inwardly against the tab and connecting the outer portions and the tab.

The rolling step may include using a forming assembly to crumple the sheet stock material and to form the sheet stock material into the tubular shape.

The method may include at least one of (a) the engaging step including using a deflector within an external forming member to turn the sheet stock material toward an interior of the tubular shape; (b) the shaping step including using a forming channel at the downstream end of the forming assembly, facing the deflector for receiving the lateral edge portions and shaping the tab; and (c) the connecting step including drawing the tab between rotating connecting members.

Finally, the present invention may include a machine for converting a sheet stock material into a relatively less dense dunnage product as the sheet stock material moves in a downstream direction, including the following elements: (a) means for rolling lateral edges of the sheet stock material towards one another to form the sheet stock material into a tubular shape; (b) means for engaging the lateral edges of the sheet stock material and urging the lateral edges to turn inwardly into an interior of the tubular shape; (c) means for bringing the lateral edges and adjacent lateral edge portions of the sheet stock material into juxtaposition; (d) means for shaping the lateral edge portions into a tab that protrudes into an interior of the tubular shape; and (e) means for connecting the lateral edge portions of the sheet stock material forming the tab.

The rolling means may include a forming assembly that defines a portion of a path for the sheet stock material through the machine in the downstream direction, the forming assembly being configured to cause lateral edges of the sheet stock material to roll towards one another to form the sheet stock material into a tubular shape. The engaging means may include a deflector at a downstream end of the forming assembly configured to engage the lateral edges of the sheet stock material and to urge the lateral edges inward into an interior of the tubular shape with lateral edge portions of the sheet stock material adjacent the lateral edges being brought into juxtaposition. The shaping means may include a forming channel at a downstream end of the forming assembly facing the deflector for receiving the lateral edge portions from the deflector and shaping them into a tab. And the connecting means may include a feeding assembly downstream of the forming assembly, the feeding assembly including rotating connecting members that engage and connect together the overlapping lateral edge portions of the sheet stock material forming the tab.

The foregoing and other features of the invention are hereinafter fully described and particularly pointed out in the claims, the following description and annexed drawings setting forth in detail certain illustrative embodiments of the invention, these embodiments being indicative, however, of but a few of the various ways in which the principles of the invention may be employed.

DETAILED DESCRIPTION

Figure 1:
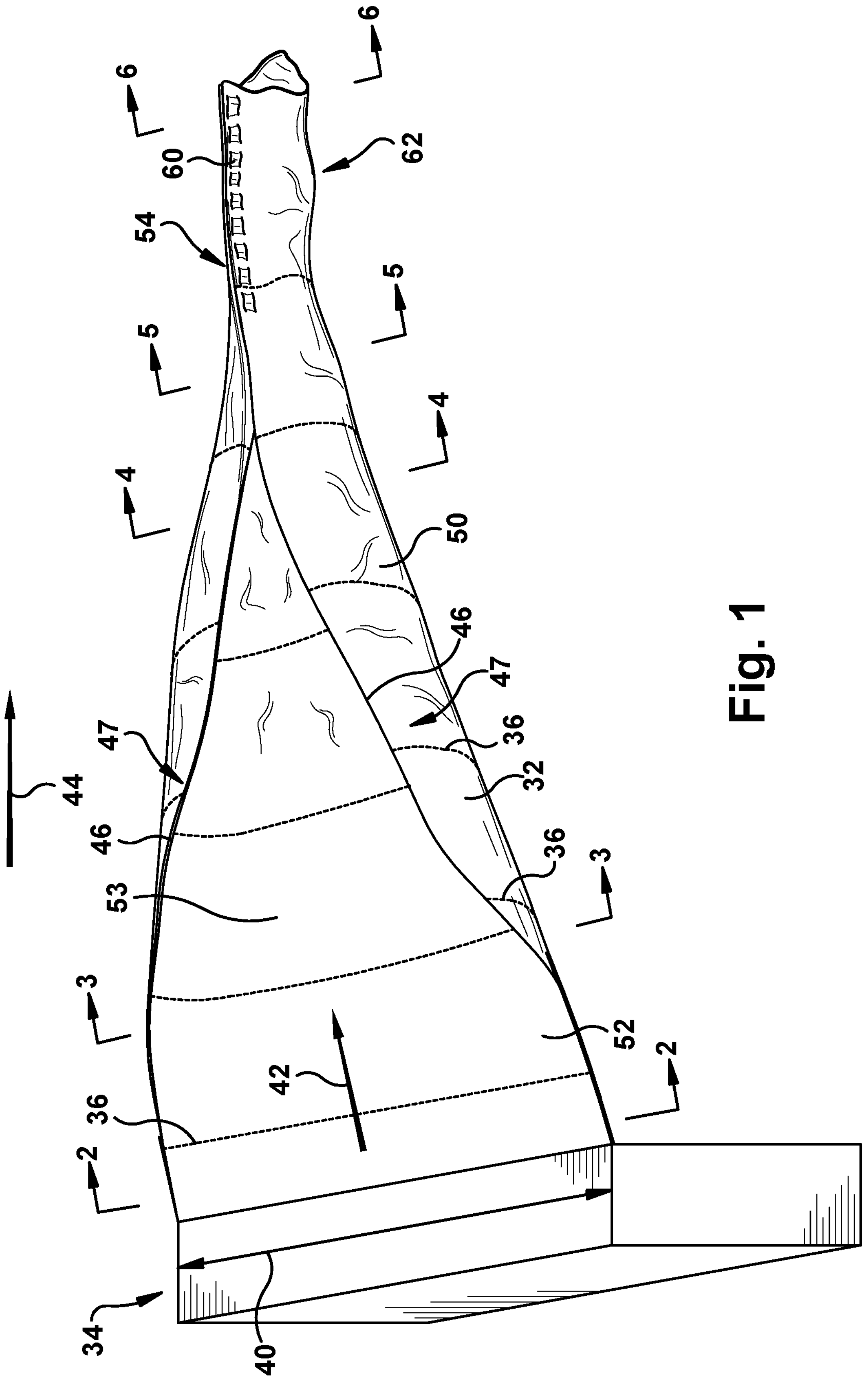
FIG. 1 is a schematic view of the conversion of a sheet stock material into a dunnage product in accordance with the present invention.
Figure 2:
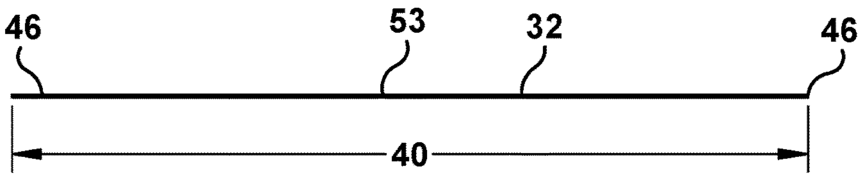
FIG. 2 is a cross-sectional view of the sheet stock material as seen at line 2-2 of FIG. 1.
Figure 3:
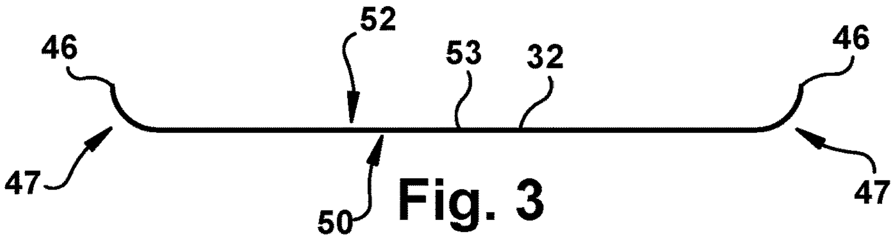
FIG. 3 is a cross-sectional view of the sheet stock material as seen at line 3-3 of FIG. 1.
Figure 4:
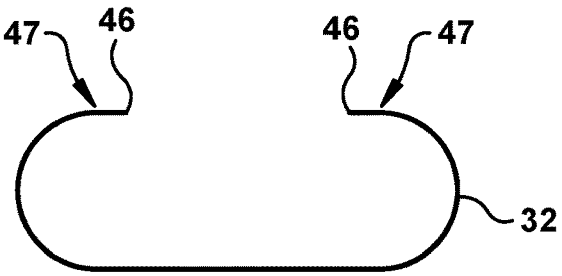
FIG. 4 is a cross-sectional view of the sheet stock material as seen at line 4-4 of FIG. 1.

As mentioned above, the present invention provides a dunnage conversion machine, a method of converting a sheet stock material into a dunnage product, and a dunnage product having a polygonal cross-section, such as a triangular cross-section, that provides improved yield. The dunnage product may be used as a void-fill dunnage product or as a cushioning product. Yield for a void-fill dunnage product can be measured by the volume occupied by the dunnage product for each unit of length or area of sheet stock material. The void-fill dunnage product provided by the present invention also may provide improved cushioning properties compared to other void-fill dunnage products.

During packaging of containers for shipment, sometimes an empty void volume remains after one or more items are placed in the container. The present invention provides a dunnage product that may be used to fill that void volume. The invention provides a machine, a method, and a dunnage product produced by the machine and method that can fill the void volume up to about 25% more efficiently, per square foot of sheet material, than some prior dunnage products. The cross-sectional shape of the dunnage product, particularly when produced from heavier sheet material, also may provide protective cushioning properties.

A schematic illustration of the conversion process performed by a dunnage conversion machine 30 in accordance with the invention is shown in FIGS. 1 to 6. The dunnage conversion machine 30 draws a sheet stock material 32 from a supply 34 of sheet stock material 32. The supply 34 of sheet stock material 32, typically positioned near the dunnage conversion machine 30, may be provided as a roll or a generally rectangular fan-folded stack. The sheet stock material 32 alternately may be referred to as stock material or sheet material, or as simply a sheet, particularly after it has been drawn from the supply.

The sheet material 32 also may be perforated along transverse lines of perforation 36 across a width dimension 40 of the sheet material 32. The lines of perforation 36 typically are spaced at regular intervals along a length dimension 42 or longitudinal dimension of the sheet material 32. The lines of perforation 36 may be coincident with transverse fold lines across a width of a fan-folded stack of sheet material. The dunnage conversion machine 30 draws the sheet material 32 from the supply 34 in a downstream direction 44, typically parallel to the longitudinal dimension 42.

The sheet stock material 32 used to make a void-fill dunnage product 45 typically has a single ply, although two or more plies may be employed, particularly when greater cushioning properties are desired. The dunnage conversion machine 30 may draw the sheet stock material 32 from the supply 34 substantially continuously, with the supply 34 being replenished as necessary. The sheet stock material 32 from a new source may be spliced to a trailing end of a preceding sheet material to provide a continuous supply of sheet stock material to the conversion machine. The supply 34 may include a stand or a mobile cart (not shown) to support the sheet material 32 for dispensing to the dunnage conversion machine 30.

As the sheet material 32 is drawn from the supply 34, the sheet material 32 generally is flat across its width. As the sheet material 32 moves downstream, in other words, in the downstream direction 44 through the dunnage conversion machine 30, the sheet material 32 is randomly crumpled and lateral edges 46 of the sheet stock material 32 are guided to turn inward, as progressively shown in FIGS. 2 to 4. A portion of the sheet material 32 adjacent the lateral edge 46 may be referred to as a lateral edge portion 47 for purposes that will be clear later in this description. As the lateral edges 46 turn inwardly, the sheet stock material 32 presents an outwardly-facing outer surface 50 and an inwardly-facing inner surface 52. The lateral edges 46 continue to turn inwardly over a central portion 53 of the sheet material 32 and advance toward one another until they meet and form a tubular, enclosed cross-sectional shape 54, approximately elliptical in cross-section in the illustrated embodiment.

Figure 5:
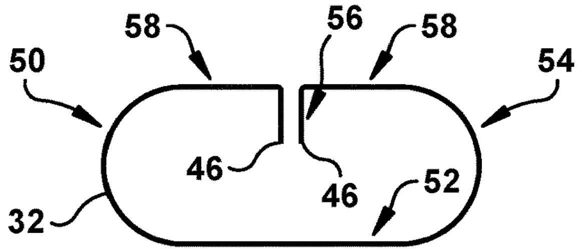
FIG. 5 is a cross-sectional view of the sheet stock material as seen at line 5-5 of FIG. 1.

As the conversion machine 30 continues to advance the sheet material 32 in the downstream direction 44, the lateral edges 46 and adjacent lateral edge portions 47 turn inwardly, into a space inside the tubular cross-sectional shape 54, as shown in FIG. 5. The formerly outwardly-facing outer surface 50 of each of the lateral edge portions 47 juxtaposed, placed in an outwardly-facing-surface to outwardly-facing-surface, or face-to-face relationship, to form an inwardly-extending tab 56. A reference to a lateral edge portion 47 includes the lateral edges 46 and adjacent portions of the sheet material 32 that form the tab 56.

Figure 6:
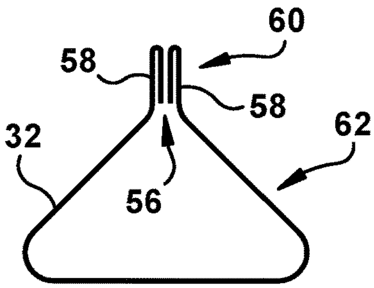
FIG. 6 is a cross-sectional view of the sheet stock material as seen at line 6-6 of FIG. 1.
Figure 7:
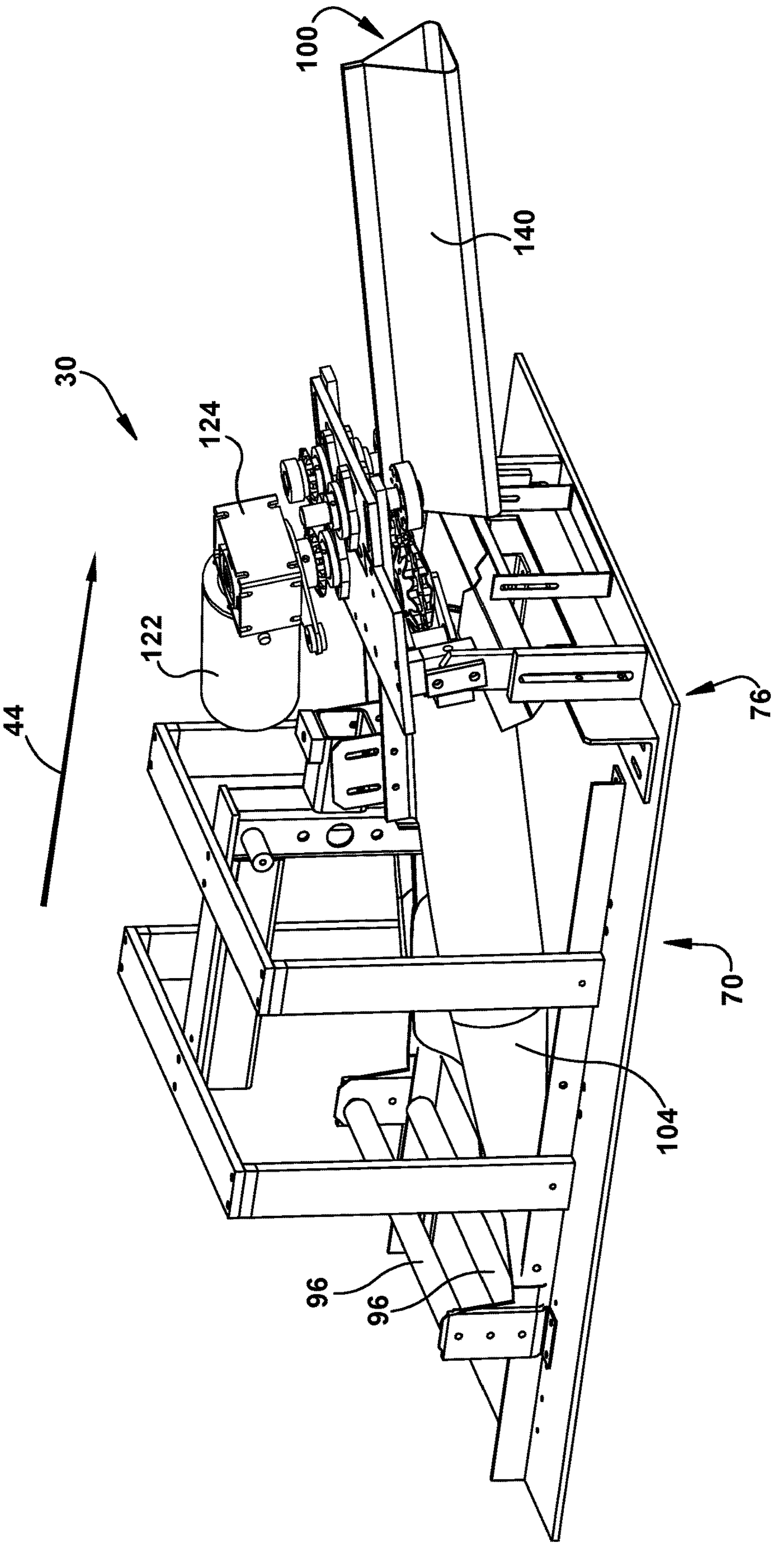
FIG. 7 is a perspective view of an exemplary dunnage conversion machine provided in accordance with the invention.
Figure 8:
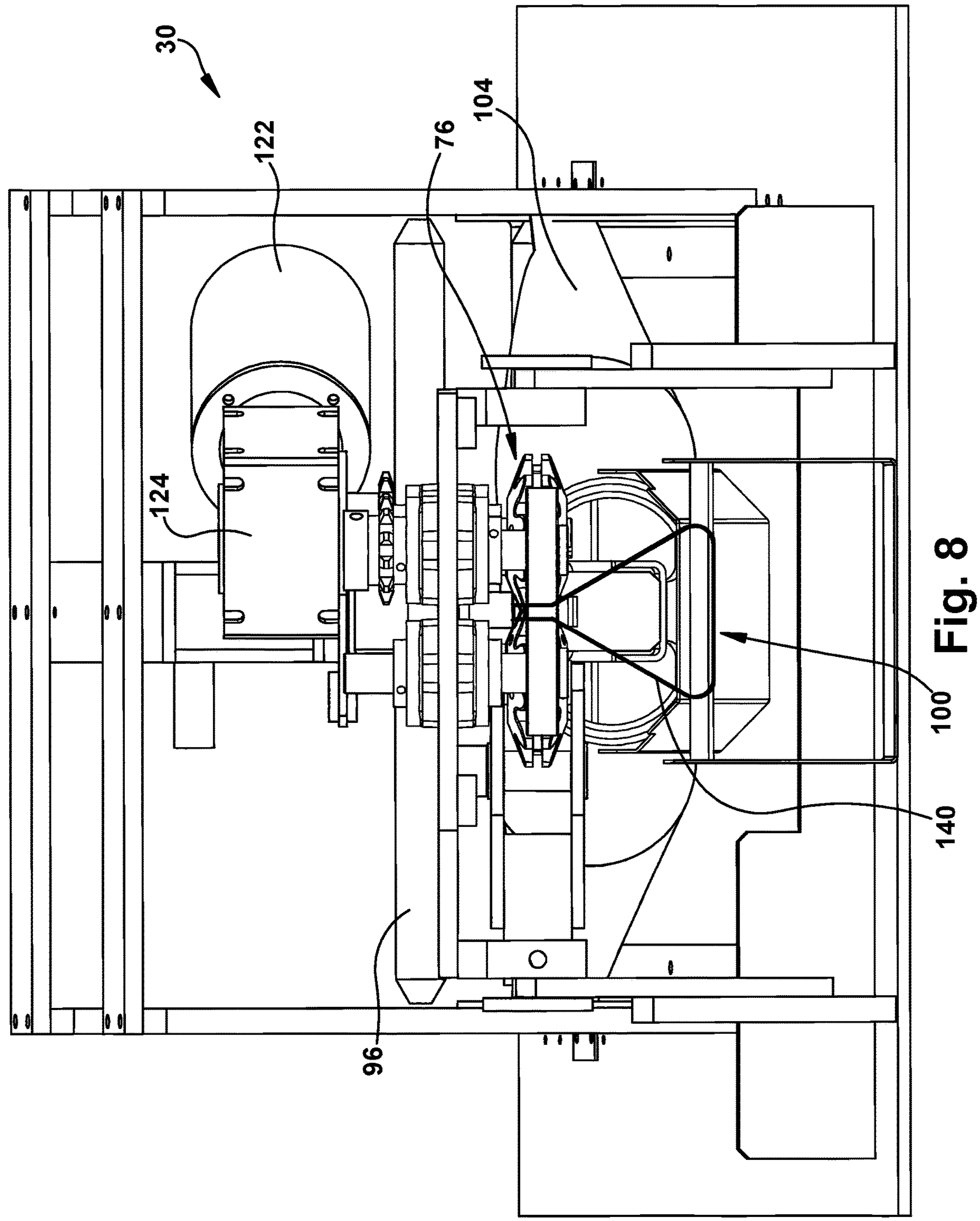
FIG. 8 is an end view of the dunnage conversion machine of FIG. 7 looking in an upstream direction from a downstream end of the dunnage conversion machine.
Figure 9:
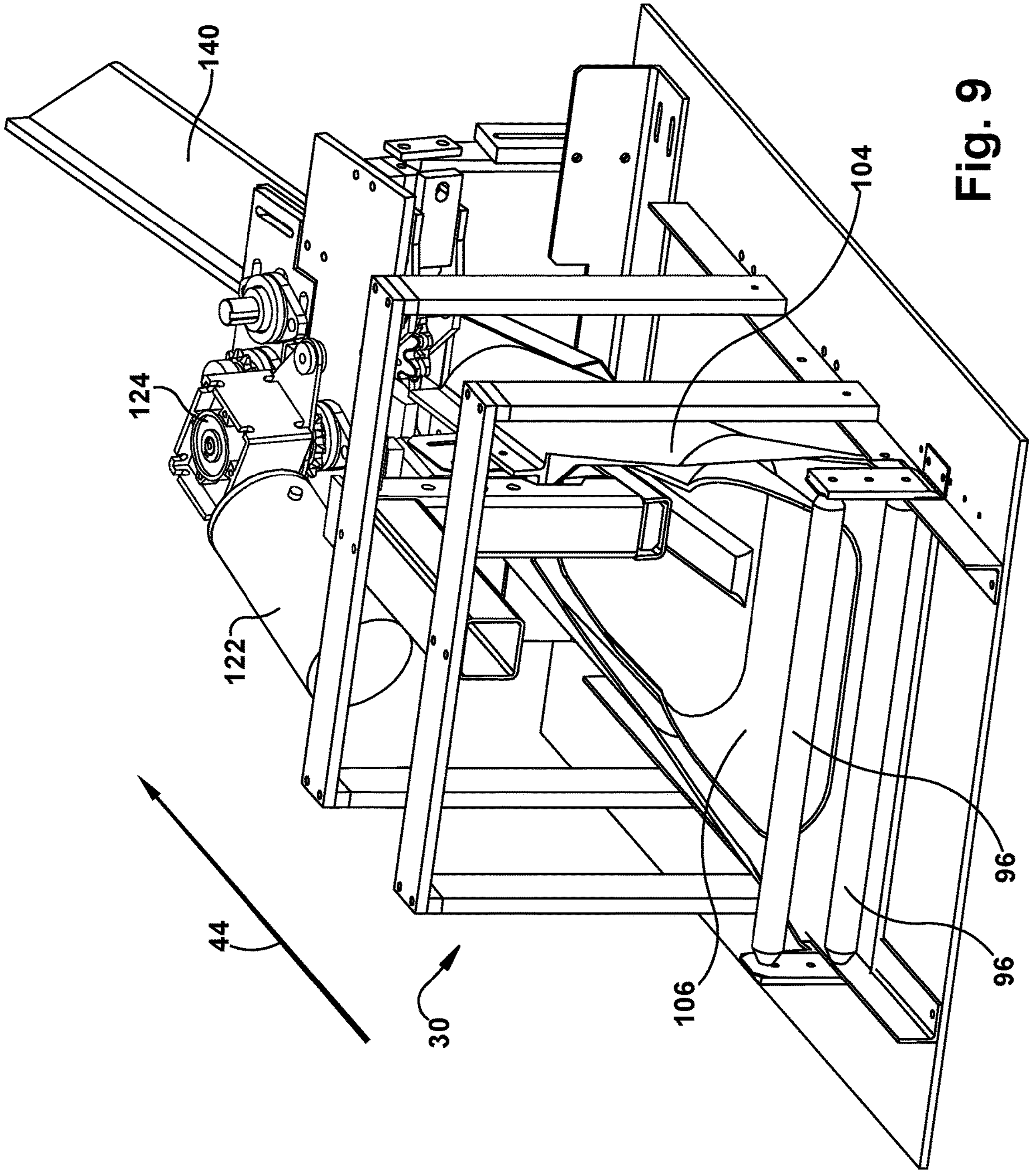
FIG. 9 is another perspective view of the dunnage conversion machine of FIG. 7, as seen from an upstream end of the dunnage conversion machine, opposite the downstream end.
Figure 10:
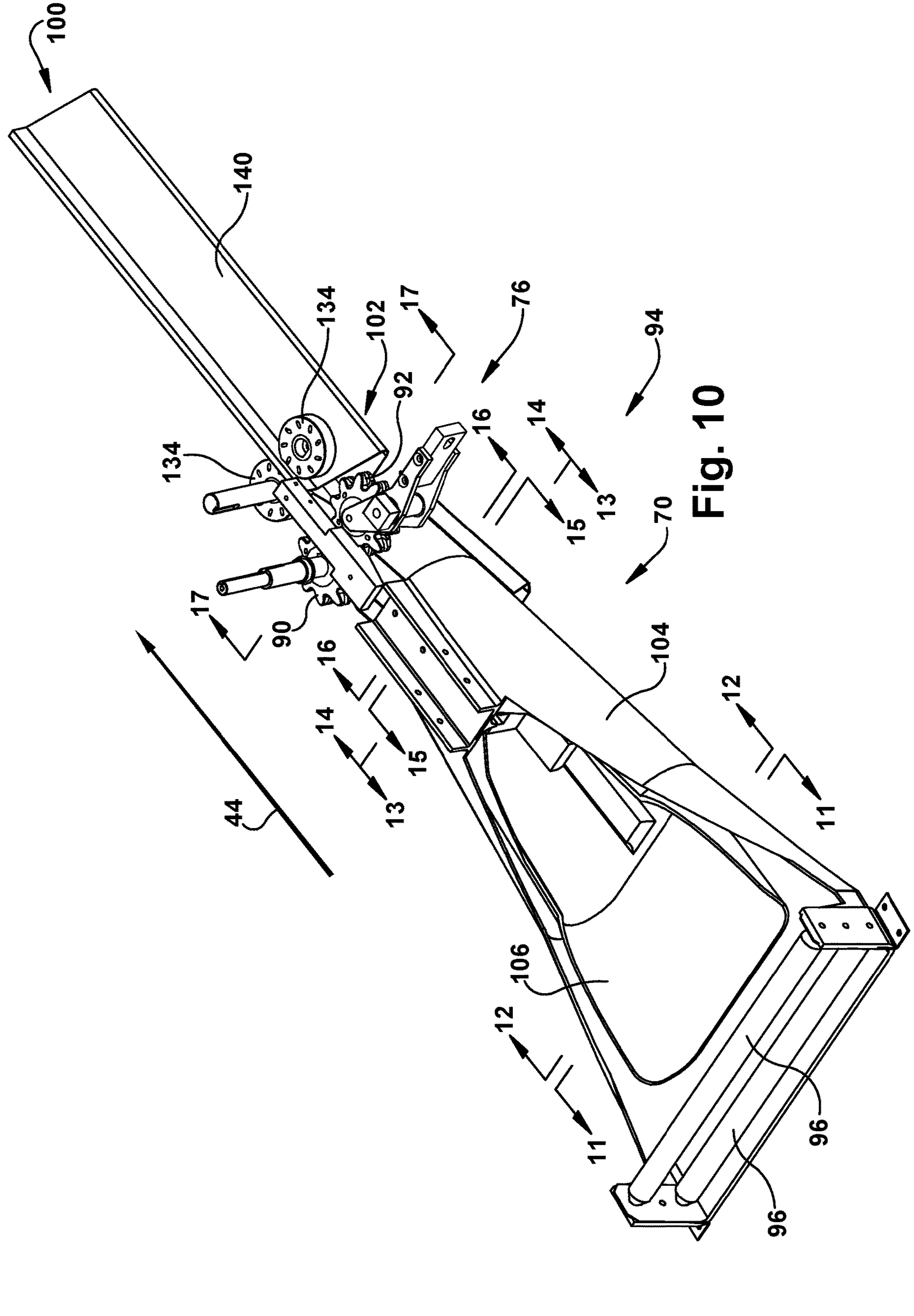
FIG. 10 is a perspective view of selected components of the dunnage conversion machine of FIG. 7 that cooperate to convert a sheet stock material into a dunnage product.
Figure 11:
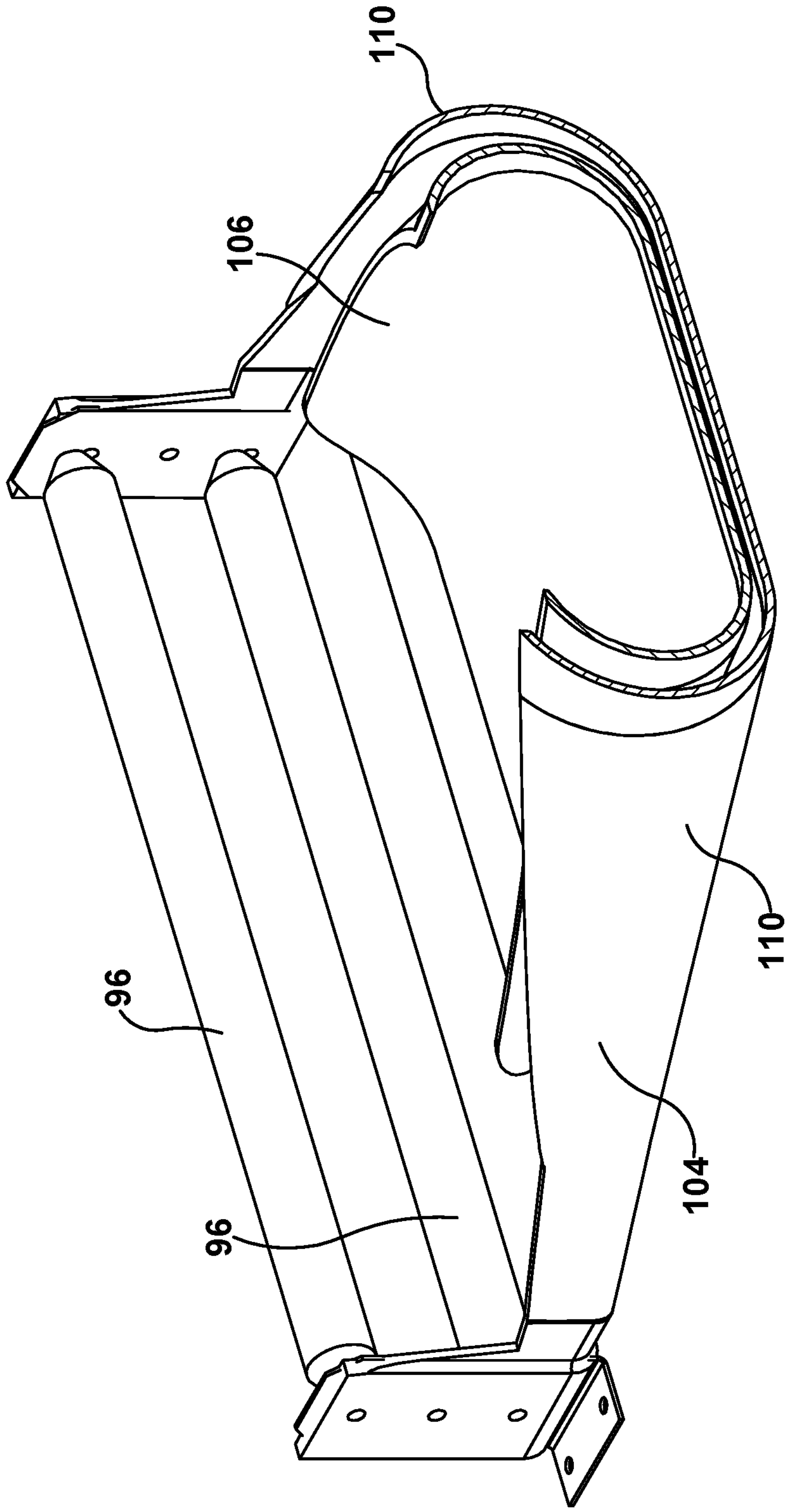
FIG. 11 is a sectional view as seen along line 11-11 of FIG. 10.
Figure 12:
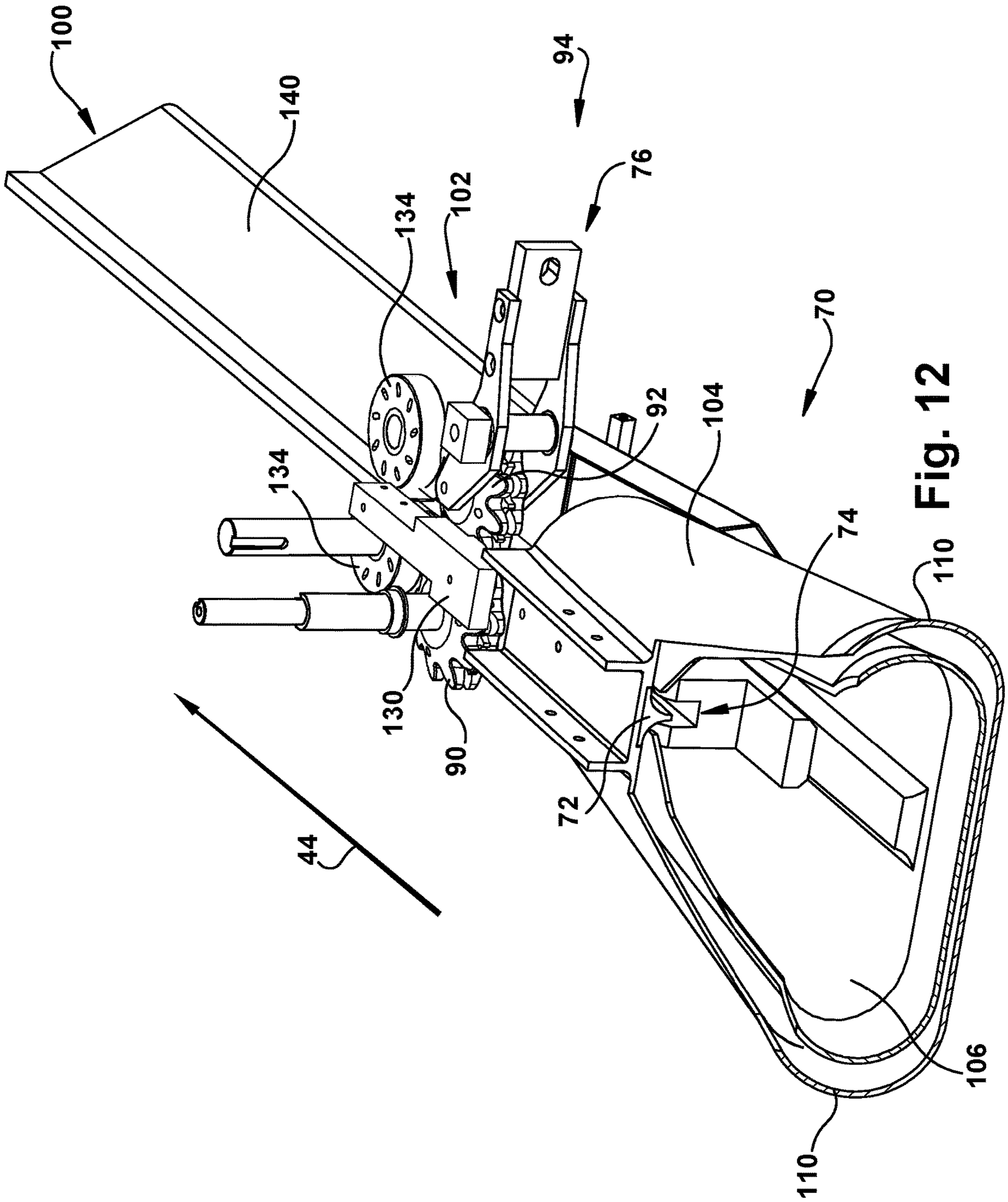
FIG. 12 is a sectional view as seen along line 12-12 of FIG. 10.
Figure 13:
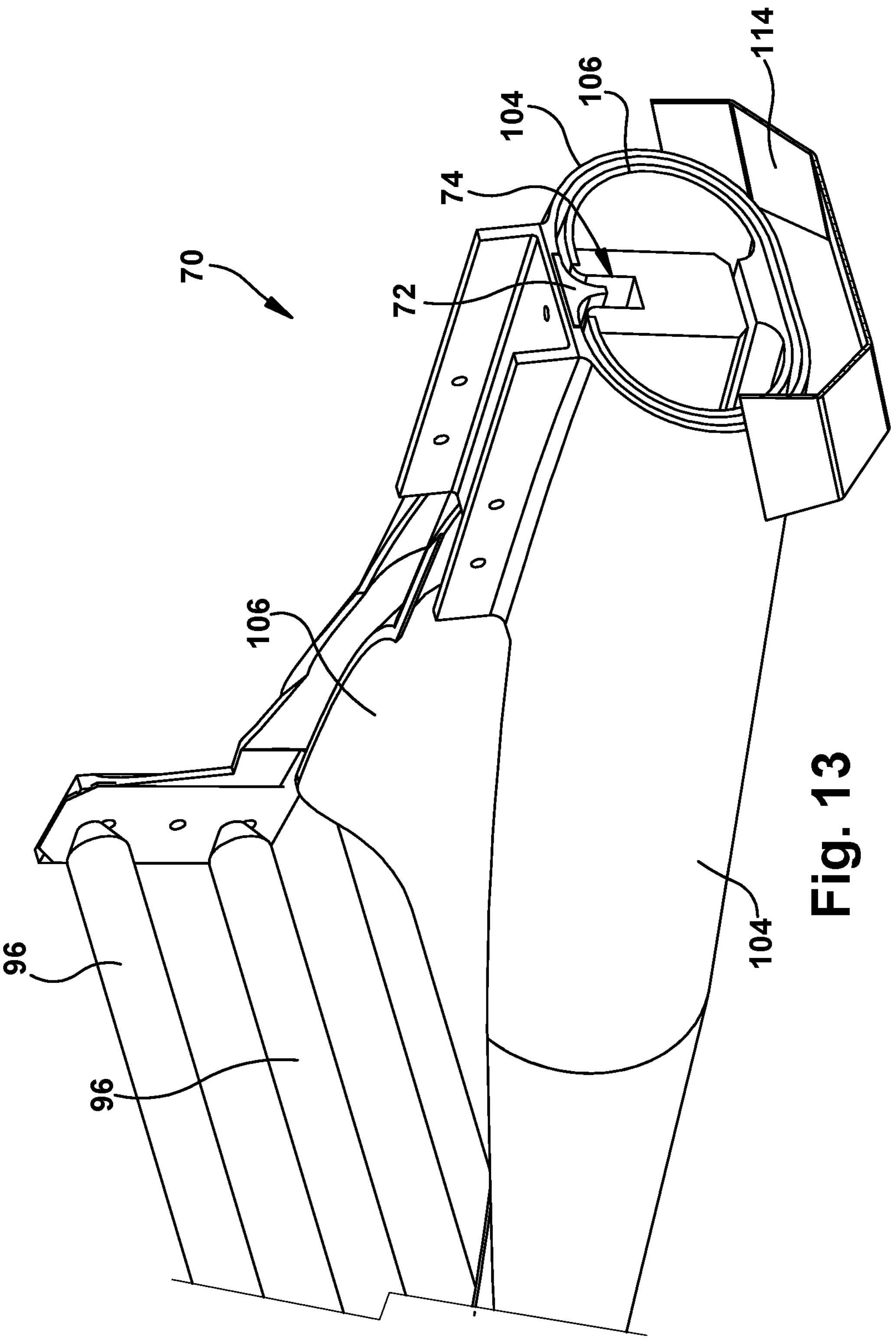
FIG. 13 is an enlarged sectional view as seen along line 13-13 of FIG. 10.
Figure 14:
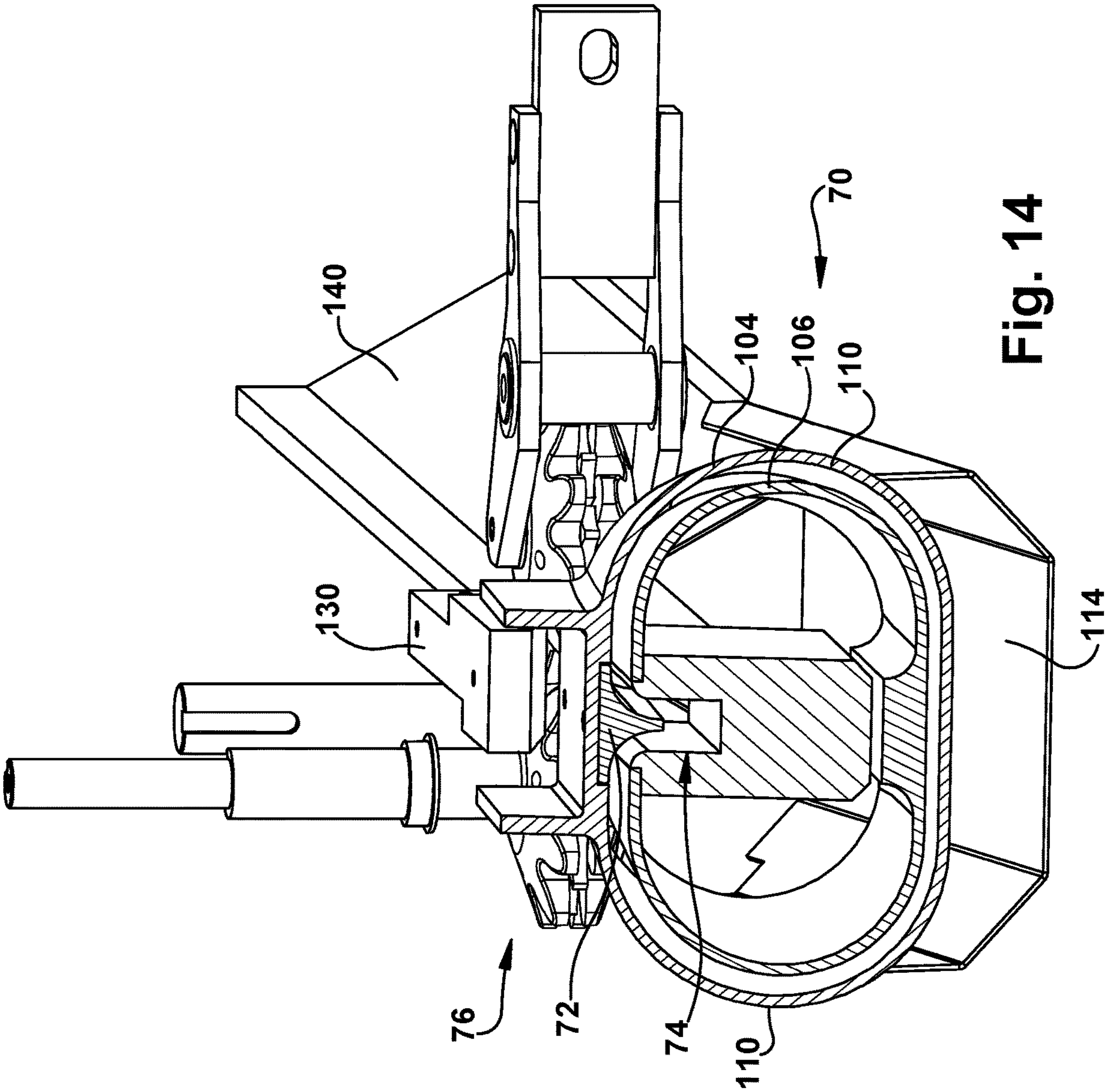
FIG. 14 is a sectional view as seen along line 14-14 of FIG. 10.
Figure 15:
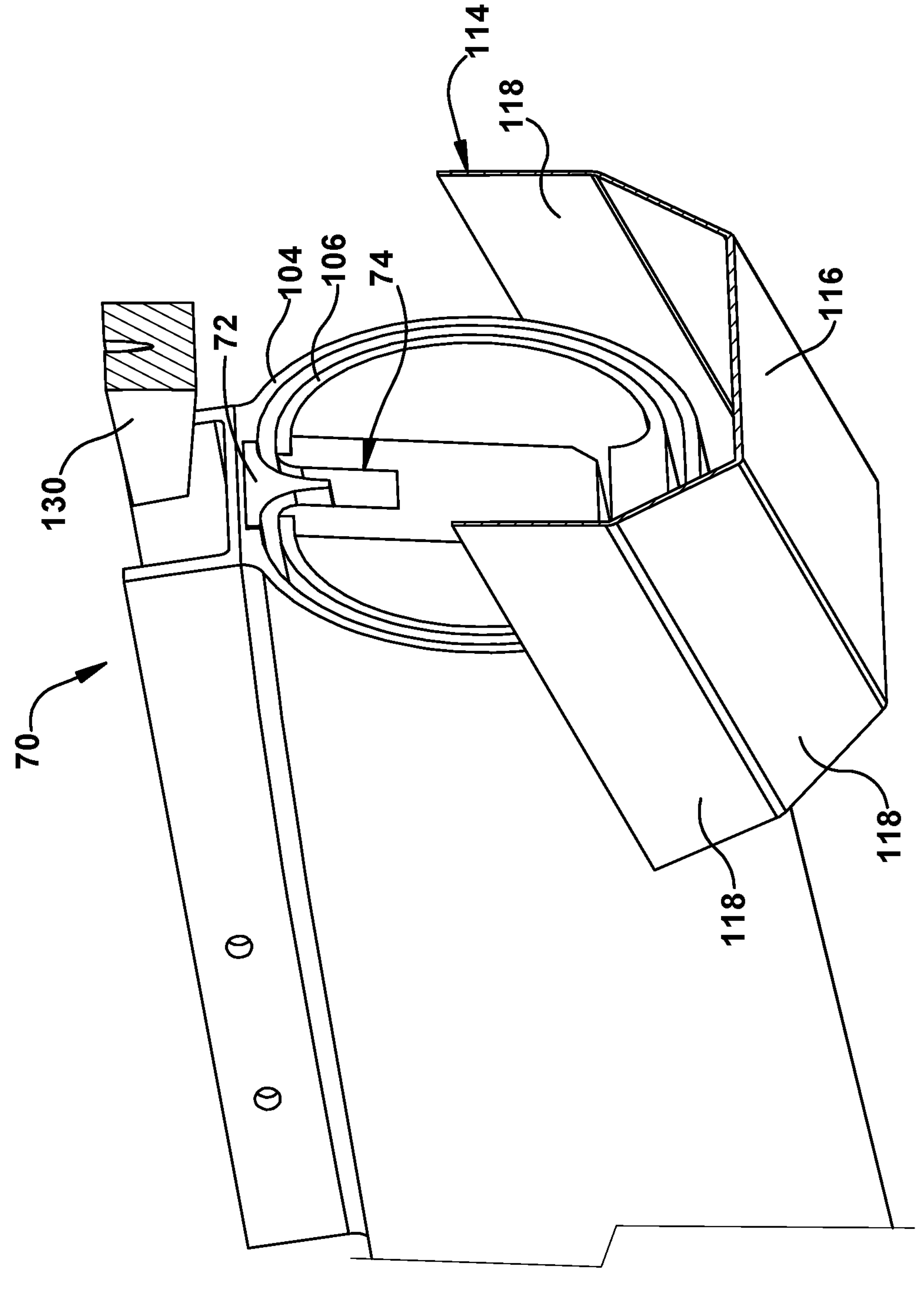
FIG. 15 is a sectional view as seen along line 15-15 of FIG. 10.
Figure 16:
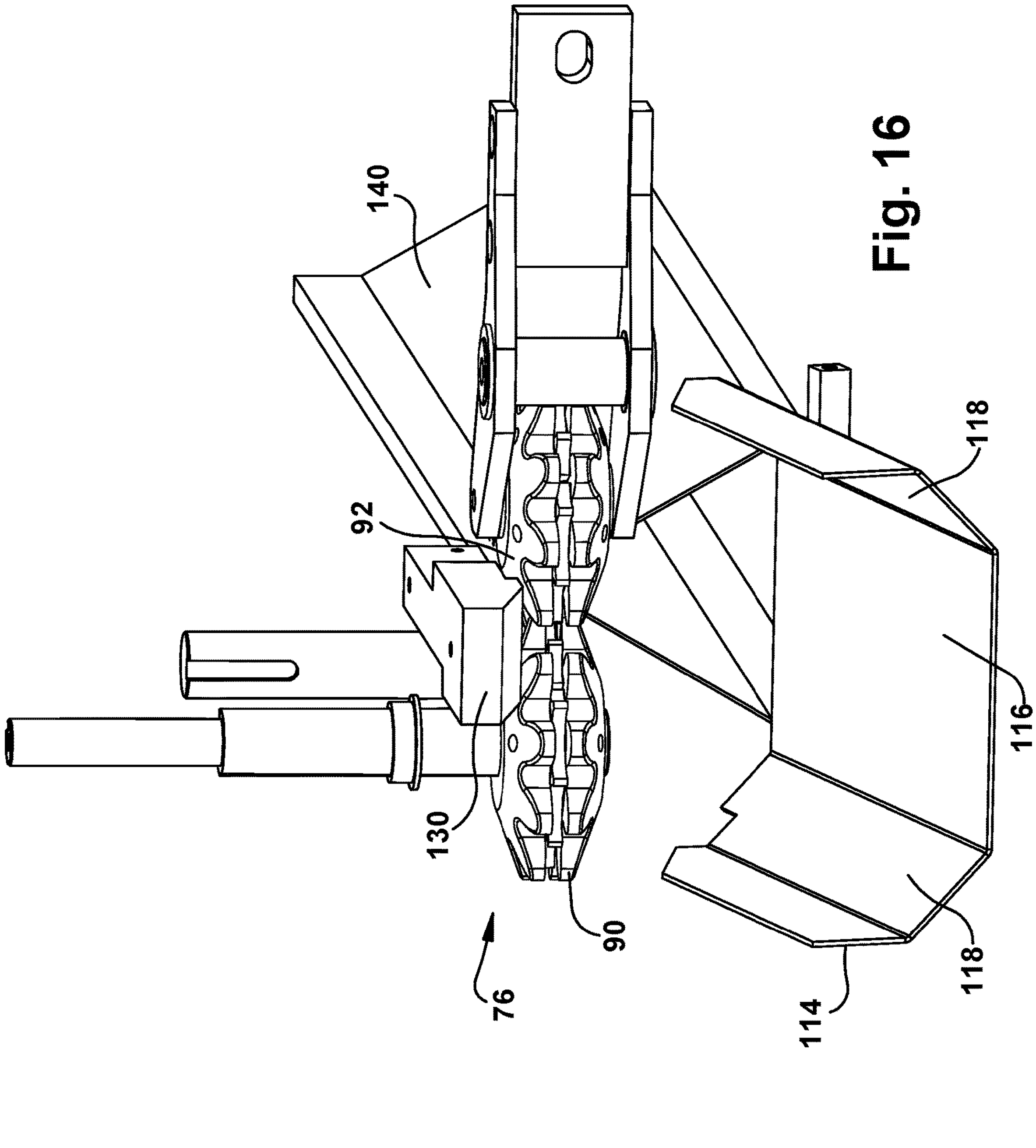
FIG. 16 is a sectional view as seen along line 16-16 of FIG. 10.
Figure 17:
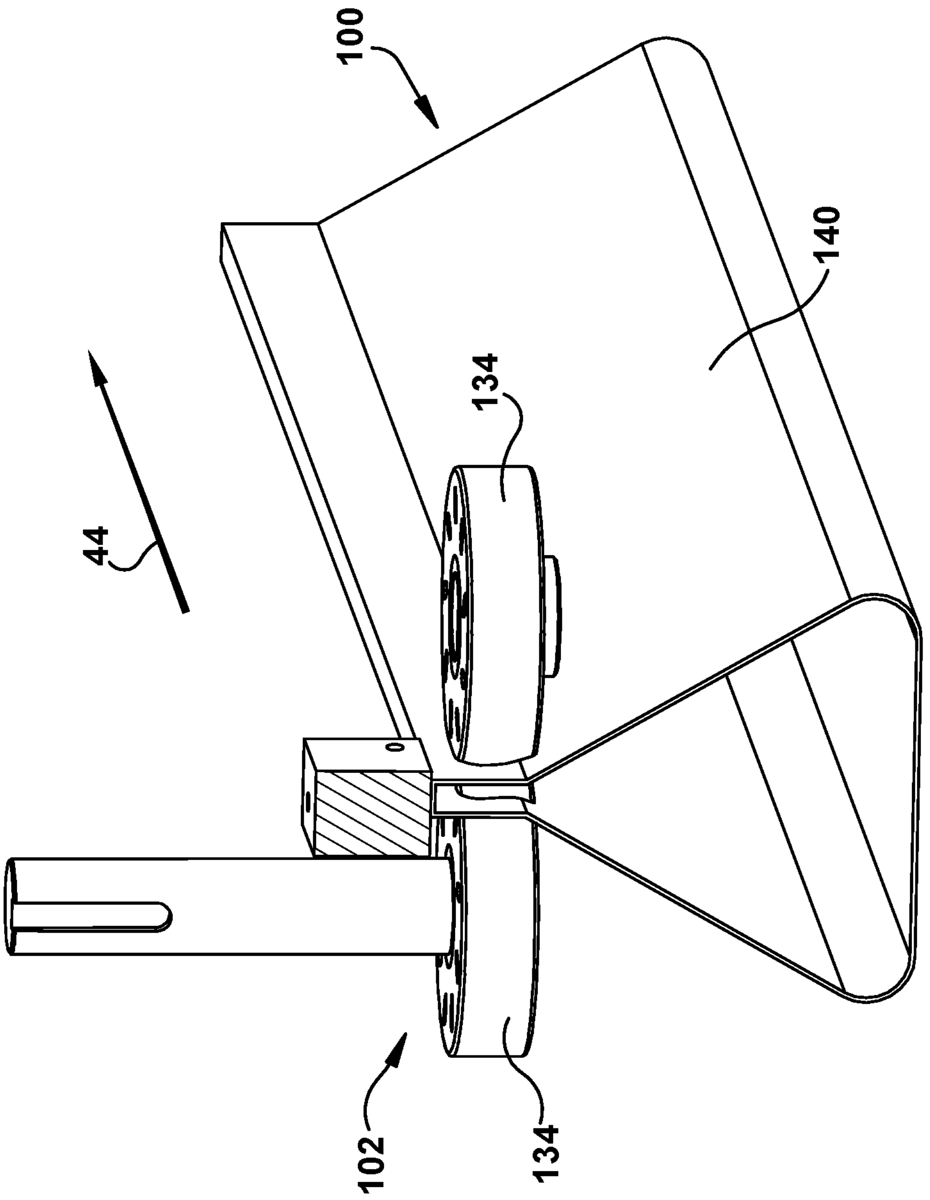
FIG. 17 is a sectional view as seen along line 17-17 of FIG. 10.

The conversion machine 30 then pinches outer portions 58 of the sheet stock material 32 adjacent the tab 56 inwardly against the tab 56, doubling the layers of sheet stock material 32 at the tab 56. The conversion machine 30 crimps the sheet material 32 at the junction between the inwardly-extending lateral edge portions 47 that define the tab 56, and the adjacent outer portions 58 of the sheet material 32 that form outer layers parallel to the tab 56 and the lateral edge portions 47 that make up the tab 56. The conversion machine 30 then connects the overlapping layers of sheet material 32 at the tab 56 to form a ridge 60 as shown in FIG. 6. The result is a tubular strip 62 of dunnage with a relatively stiffer ridge 60 on one side.

Discrete dunnage products 45 (FIG. 18) may be separated from the tubular strip 62 for use in packaging, such as by tearing along one of the lines of perforation 36 or by cutting the tubular strip 62 once formed. The tubular strip 62 may be stiffened by using a heavier weight of paper, and the cushioning properties may be increased by selecting heavier weights of paper and by filling the interior of the tubular strip with inwardly gathered and crumpled sheet material.

Accordingly, the present invention also provides a method for converting a sheet stock material 32 into a relatively less dense dunnage product 45 as the sheet stock material 32 moves in the downstream direction 44. The method includes the following steps: (a) rolling lateral edges 46 of the sheet stock material 32 towards one another to form the sheet stock material 32 into a tubular shape 54; (b) engaging the lateral edges 46 of the sheet stock material 32 and urging the lateral edges 46 to turn inwardly into an interior of the tubular shape 54; (c) bringing the lateral edges 46 and adjacent lateral edge portions 47 of the sheet stock material 32 into juxtaposition; (d) shaping the lateral edge portions 47 into a tab 56 that protrudes into an interior of the tubular shape 62; and (e) connecting the lateral edge portions 47 of the sheet stock material 32 forming the tab 56.

Put in terms of a corresponding machine, the present invention provides a conversion machine 30 for converting a sheet stock material 32 into a relatively less dense dunnage product 45 as the sheet stock material 32 moves in the downstream direction 44, where the machine 30 includes the following elements: (a) means for rolling lateral edges 46 of the sheet stock material 32 towards one another to form the sheet stock material 32 into a tubular shape 54; (b) means for engaging the lateral edges 46 of the sheet stock material 32 and urging the lateral edges 46 to turn inwardly into an interior of the tubular shape 54; (c) means for bringing the lateral edges 46 and adjacent lateral edge portions 47 of the sheet stock material 32 into juxtaposition; (d) means for shaping the lateral edge portions 47 into a tab 56 that protrudes into an interior of the tubular shape 54; and (e) means for connecting the lateral edge portions 47 of the sheet stock material 32 forming the tab 56.

As further described below with reference to FIGS. 7 to 17, the rolling means may include a forming assembly 70 that defines a portion of a path for the sheet stock material 32 through the machine 30 in the downstream direction 44. The forming assembly 70 is configured to cause lateral edges 46 of the sheet stock material 32 to roll towards one another to form the sheet stock material 32 into the tubular shape 56. The engaging means may include a deflector 72 at a downstream end of the forming assembly 70 configured to engage the lateral edges 46 of the sheet stock material 32 and to urge the lateral edges 46 inward into an interior of the tubular shape 54 with lateral edge portions 47 of the sheet stock material 32 adjacent the lateral edges 46 being brought into juxtaposition. The shaping means may include a forming channel 74 at a downstream end of the forming assembly 70 that faces the deflector 72 to receive the lateral edge portions 47 from the deflector 72 and shape them into the tab 56. And the connecting means may include a feeding assembly 76 downstream of the forming assembly 70, the feeding assembly 76 including rotating connecting members 90, 92 that engage and connect together the overlapping lateral edge portions 47 of the sheet stock material 32 forming the tab 56 to form the ridge 60.

An exemplary dunnage conversion machine 30 for converting the sheet stock material 32 (FIG. 1) into a dunnage product 45 will now be described in more detail. The illustrated dunnage conversion machine 30 can convert a sheet stock material into the relatively less dense dunnage product as the sheet stock material moves in the downstream direction 44 through the dunnage conversion machine 30. The dunnage conversion machine 30 may be referred to alternatively as a dunnage conversion machine, a conversion machine, a dunnage converter, or simply as a converter.

Figure 18:
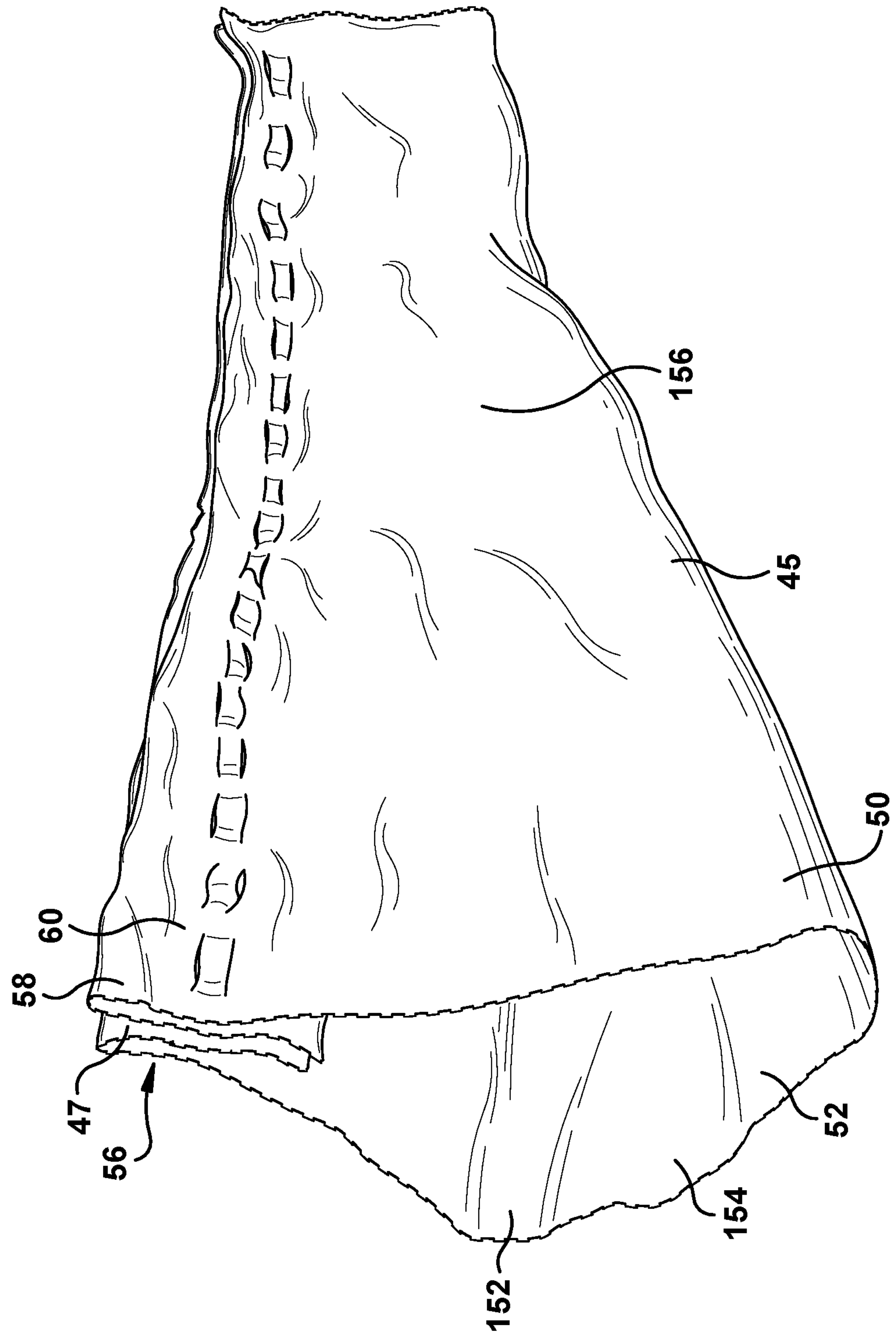
FIG. 18 is a perspective view of a dunnage product provided in accordance with the present invention.

The conversion machine 30 may include a housing (not shown) enclosing the operative components that convert the sheet material 32 (FIG. 1) into a dunnage product 45 (FIG. 18). Such operative components may include a conversion assembly 94. The conversion assembly 94 draws the sheet stock material 32 from the supply 34 and into the housing through an inlet at an upstream end of the conversion machine 30 (FIG. 1). In the illustrated embodiment, the sheet material is drawn in a serpentine manner over and under a pair of guide rollers 96 that extend across a path of the sheet material through the conversion machine 30. The guide rollers 96 help to keep the sheet material aligned and relatively flat as the sheet material enters the conversion assembly 94. As the conversion assembly 94 advances the sheet stock material in the downstream direction 44 through the conversion machine 30, the conversion assembly 94 converts the sheet stock material into the dunnage product 45, which has a lower density than the sheet material in the supply 34 (FIG. 1). The conversion assembly 94 outputs the discrete dunnage product 45 (FIG. 18), ready for use, from an outlet 100 at a downstream end of the conversion machine 30.

The conversion assembly 94 may include the forming assembly 70 mentioned above. The forming assembly 70 defines a portion of the path for the sheet stock material through the conversion machine 30 in the downstream direction 44, and shapes the sheet stock material into the tubular shape 54 (FIG. 1) described above. The forming assembly 70 also is configured to randomly crumple the sheet material and to cause the lateral edges 46 of the sheet material to roll towards one another to convert the generally planar sheet stock material into a three-dimensional, relatively lower density strip 62 with a tubular shape 54. The forming assembly 70 also is configured to bring the lateral edges 46 of the sheet stock material into juxtaposition to form the tab 56 extending into an interior of the tubular shape 54.

The conversion assembly 94 also may include the feeding assembly 76, downstream of the forming assembly 70, that draws the sheet material from the supply, into and through the forming assembly 70, and out the outlet 100 at the downstream end, while also connecting overlapping layers of sheet material, including the tab 56, to form the strip of dunnage 62 (FIG. 1). Finally, the conversion assembly 94 may include a severing assembly 102 downstream of the feeding assembly 76 that separates discrete dunnage products 45 of a desired length traverse the downstream direction 44 from the tubular strip of dunnage 62.

Referring now to FIGS. 10 to 17, which show an exemplary conversion assembly 94. Beginning with the forming assembly 70, the illustrated forming assembly 70 includes an external forming member 104 that causes the lateral edges of the sheet material to turn inwardly; an internal forming member 106 that extends into the external forming member 104 and around which the sheet material turns, causing the sheet material to form a tubular shape; the deflector 72, which is mounted at a downstream end of the external forming member 104 and extends into a path of the lateral edges of the sheet material to redirect the lateral edges inwardly toward an interior of the tubular shape; and the forming channel 74 at a downstream end of the external forming member 104 extending parallel to and spaced from the deflector 72 to receive the lateral edges of the sheet material and to define a length of the tab. The external forming member 104 has curved interior side surfaces that converge towards one another narrowing a width dimension of the external forming member 104 in the downstream direction 44. The external forming member 104 may be a converging chute 104 with curved side walls that converge toward each other at a downstream end of the converging chute 104. The curved interior side walls 110 form the interior side surfaces.

As the sheet material is drawn through the converging chute 104, the lateral edges of the sheet material will follow the interior side walls 110 of the converging chute 104, and as the converging chute 104 narrows, the lateral edges will turn inwardly and move up the curved interior side walls 110 of the converging chute 104 as shown in FIGS. 1 to 4 described above. Friction with the interior side surfaces causes the sheet stock material to randomly crumple and crease as the sheet stock material passes through the converging chute 104. The interior side surfaces formed by the curved side walls 110 of the converging chute 104 may be continuous, and may be configured to engage the lateral edges of the sheet material as the sheet material travels downstream through the converging chute 104.

The internal forming member 106 extends into the external forming member 104 and may be spaced inwardly from the interior side surfaces of the converging chute or other external forming member to constrain movement of the sheet stock material therebetween along a portion of the path for the sheet stock material. The path through the forming assembly 70, between the converging chute 104 and the internal forming member 106, may narrow in the downstream direction 44 or may have a substantially constant thickness. The internal forming member 106 also may assist in the random crumpling generated in the space between the internal forming member 106 and the converging chute 104. The internal forming member 106 may be coextensive with the conveying chute 104 along a longitudinal axis extending in the downstream direction 44. To further increase the cushioning properties of the dunnage product, another ply of sheet material may be provided and drawn through a passage (not shown) through the internal forming member 106, inwardly gathering and randomly crumpling an internal ply of sheet stock material, to provide additional cushioning inside the tubular shape of the strip.

The deflector 72 at the downstream end of the converging chute 104 protrudes inwardly from an inside surface of the converging chute 104 to redirect the lateral edges of the sheet material after the lateral edges have turned upwardly and then inwardly toward one another. As the sheet material advances downstream through the converging chute 104, the lateral edges turn around the internal forming member 106 and advance toward each other from opposite directions. As the lateral edges approach one another to close the cross-sectional shape of the tubular strip, they engage the inwardly-extending deflector 72. The deflector 72 urges the lateral edges to turn inwardly, redirecting the lateral edges in a common direction toward the interior of the tubular shape 54 and into the forming channel 74.

In the illustrated embodiment, the sheet material enters a bottom side of the converging chute 104 in the illustrated orientation, and the lateral edges move upward and then back inward, toward each other, at a top side of the converging chute 104 as they wrap around the internal forming member 106. The deflector 72 is mounted at the downstream end of the converging chute 104, at the top side in the illustrated embodiment. The deflector 72 is mounted to extend generally perpendicular to the inside surface at the top side of the converging chute 104, generally opposite the central portion of the sheet material, such that as the lateral edges each turn around the internal forming member 106 and advance toward the opposing lateral edge, the deflector 72 intercepts the lateral edges and changes the direction of each lateral edge so that they turn inwardly, toward a center of the converging chute 104. Opposing surfaces of the deflector 72 may be curved to facilitate redirecting the lateral edges in the desired direction. As a result, after engaging the deflector 72 the lateral edges move in the same direction along parallel paths into the interior of the closed cross-sectional shape 54 of the tubular strip 62 and into the forming channel 74 facing the deflector 72.

The forming channel 74 is defined by an element that extends inside the converging chute 104, at the downstream end of the forming assembly 70, facing, generally parallel to, and spaced from the deflector 72. The forming channel 74 may be formed as a groove or slot by or in an external surface of the internal forming member 106, as shown, or in a separate element. The forming channel 74 receives the lateral edges of the sheet material after the deflector 72 turns the lateral edges inwardly along parallel paths. The forming channel 74 thus cooperates with the deflector 72 to form the tab 56 (FIG. 1) that protrudes into the interior of the tubular shape cross-section of the strip 62. The tab 56 (FIG. 1) is formed by the inwardly-turned, lateral edge portions of the sheet material arranged in a parallel, face-to-face relationship. A depth of the forming channel 74 and its spacing from the deflector 72 and the inside surface of the converging chute 104 defines the maximum length of the tab.

Put another way, the forming assembly 70 turns the lateral edges of the sheet material along the curved interior surfaces of the converging chute 104 until the lateral edges meet at the deflector 72 and turn inward along parallel paths into the forming channel 74. The forming channel 74 guides the lateral edge into the interior of the closed-shape cross-section, with the outwardly-facing outer surfaces 50 (FIG. 1) of respective lateral edge portions coming into an overlapping, face-to-face relation to form the tab extending into the interior of the tubular shape as the sheet material travels in the downstream direction 44 the feeding assembly 76.

The forming assembly 70 may further include a forming plough 114 extending into the path of the sheet material at the downstream end of the converging chute 104 opposite the forming channel 74 and the deflector 72 to help shape the strip of dunnage. The forming plough 114 has a central portion 116 positioned to extend into the path of the sheet material and engage a central portion of the sheet material forming a bottom side of the tubular shape 56 opposite the tab, with lateral wing portions 118 extending outward from the central portion 116 that help to keep the strip of dunnage 62 centered as the sheet material passes the forming plough 114. The central portion 116 of the forming plough 114 may partially flatten the randomly-crumpled sheet material in the tubular shape 54 opposite the tab 56 while urging the sheet material upward toward the feeding assembly 76. The forming plough 114 cooperates with the conveying chute, internal forming member, and the feeding assembly 76 to impart a generally triangular cross-sectional shape to the tubular strip exiting the converging chute 104, with the ridge being formed by the feeding assembly 76 at an apex opposite the forming plough 114. The forming plough 114 may have other shapes and positions to impart different shapes to the crumpled strip of dunnage.

As the sheet material leaves the converging chute 104 and is pulled into the feeding assembly 76, portions 58 (FIG. 5) of the sheet material adjacent but not part of the tab are inwardly gathered or pinched to extend generally parallel to and outside the lateral edge portions that define the tab. The feeding assembly 76 pulls the sheet material from the supply and through the forming assembly 70 and then connects the overlapping layers of the tab and the folded-down or pinched adjacent outer portions of the sheet material to form the ridge with the overlapping layers of sheet material fixed together.

The feeding assembly 76 may include a pair of connecting members 90 and 92 that are rotatable and configured to engage and draw the sheet material therebetween while also connecting overlapping layers of sheet material forming the tab and outer portions of the sheet material outside but adjacent the tab, to form the ridge. The tab is essentially pinched between layers of sheet material outwardly adjacent to the inwardly-turned lateral edge portions that make up the tab. The ridge thus generally includes four layers of sheet material, two layers (the lateral edge portions) of the sheet material forming the tab, and two layers from adjacent outer portions of the tubular shape that are outside the tab but have been brought into juxtaposition by the connecting members and connected to the tab.

Each of the connecting members 90, 92 may have multiple gear-like segments stacked along an axis of rotation and configured to interengage respective opposing segments of the opposing connecting member 90, 92. The connecting members 90, 92 may cut parallel slits in the sheet material and displace the sheet material between the slits out of the plane of the sheet material outside the slits. The band of sheet material between the slits that is displaced from adjacent portions of the sheet material adjacent to but outside the slits holds together the layers of sheet material that form the ridge. This method of connecting multiple layers of sheet stock material may be referred to as stitching.

The ridge may have a stiffness greater than the stiffness of those portions of the sheet stock material not forming the ridge; the extra layers of sheet material in the ridge and the connected nature of the layers makes the ridge relatively stiffer than other portions of the tubular shape.

The rotating connecting members 90, 92 are driven by a feed motor 122 via a gearbox 124 and a suitable controller (not shown) configured to control the feed motor 122 in a well-known manner. The controller typically includes a processor, a memory, an input, an output, and suitable program instructions stored in memory. Typically only one connecting member 90 is driven by the feed motor 122 (the driven connecting member 90) and the other connecting member (the following connecting member 92) is driven through a gear-like engagement with the driven connecting member 90. In the illustrated embodiment, the following connecting member 92 is biased toward the driven connecting member 90, such as with a spring. The rotating connecting members 90, 92 rotate about parallel axes transverse the path of the sheet material and transverse the converging dimension of the converging chute 104. The converging dimension is a dimension of the converging chute 104 transverse the downstream direction 44 that decreases in the downstream direction 44, and generally is parallel to the width dimension of the sheet material.

To help ensure that the sheet material passes to the feeding assembly 76, the conversion machine 30 may further include a guide (not shown) between the forming assembly 70 and the feeding assembly 76 and configured to urge the outer portions of the sheet stock material respectively adjacent opposite sides of the tab toward the tab for passage to the feeding assembly 76 along with the tab such that the outer portions are connected to the tab and with the tab form the ridge. The guide may have a central portion extending transversely to rotational axes of the rotating connecting members 90, 92 for preventing the tab from moving outwardly away from the rotating connecting members 90, 92 in the direction of the rotational axes.

The guide may extend into the path of the sheet stock material to urge the tab and the sheet material adjacent the tab into the feeding assembly 76. The guide may have lateral side wings that engage the adjacent outer portions of the sheet stock material for urging them towards respective ones of the opposite sides of the tab for passage along with the tab between the rotating connecting members 90, 92.

An upper guide block 130 may be provided opposite the rotating connecting members 90, 92 interposing the rotating connecting members 90, 92 between the upper guide block 130 and the forming plough 114, to control how far the layers of sheet material that will form the ridge 60 (FIG. 1) can extend beyond the rotating connecting members 90, 92.

The conversion assembly 94 also may include the severing assembly 102 downstream of the feeding assembly 76 to separate dunnage products 45 (FIG. 18) of desired lengths from the strip of dunnage 62. The severing assembly 102 may include a cutting blade that moves across the path of the sheet material to cut the dunnage product to the desired length. If a pre-perforated sheet material is used, however, the operator can manually separate dunnage products from the strip at the perforations, and the severing assembly 102 may be omitted, or the severing assembly may include a cutting blade that just cuts the ridge 60 and the operator tears the rest of the sheet material to separate dunnage products from the strip.

In the illustrated embodiment, another type of severing assembly 102 is provided to automatically separate discrete dunnage products 45 (FIG. 18) from the strip of dunnage 62 along lines of perforations 36 provided in the sheet material 32 drawn from the supply 34 (FIG. 1). The severing assembly 102 includes a pair of separating rollers 134, parallel to and downstream from the rotating connecting members 90, 92, positioned to receive and pass the ridge 60 (FIG. 1) therebetween. The separating rollers 134 may be driven to feed the ridge 60 at the same rate that the rotating connecting members 90, 92 feed the ridge 60 or slightly faster to maintain tension in the sheet material to minimize or prevent jamming in the rotating connecting members 90, 92. The separating rollers 134 also may be driven to advance the ridge 60 at a faster rate than the rate at which the connecting members 90, 92 advance the ridge to separate discrete dunnage products 45 from the strip. Advancing the ridge 60 at the faster rate creates tension in the sheet material between the connecting members 134 of the feeding assembly 76 and the separating rollers 134 of the severing assembly 102, and this tension can be used to cause the sheet material to separate at a line of perforations 36 (FIG. 1) or to continue a partial cut through the ridge 60, thereby separating a discrete dunnage product of a desired length from the strip of dunnage. The action of the separating rollers 134 increases the speed of the separated dunnage product, and may be used to propel the dunnage product into a container for use. The separating rollers 134 may be driven by an appropriately-geared connection to the feed motor 122.

The path of the sheet material downstream of the severing assembly 102 may be defined by an output chute 140, as shown, which has a desired cross-sectional shape, such as a triangular cross-section as in the illustrated embodiment, that further facilitates shaping the strip of dunnage prior to separation and the discrete dunnage products separated from the strip of dunnage. The triangular shape is stable and provides rigidity in all directions. The dunnage product may have another closed cross-sectional shape other than triangular, and an output chute having a desired non-triangular cross-section may be provided to help shape the dunnage product prior to use. Alternatively, the output chute 140 may be omitted or may have a shape that has no intended effect on the shape of the dunnage product. The dunnage products 45 (FIG. 18) exit the conversion machine 30 at the outlet 110 at the downstream end of the output chute 140.

The present invention also provides a dunnage product 45, shown in FIG. 18, which may be produced by the conversion machine 30 described above. The dunnage product 45 is made from a sheet stock material formed into a tube having at least three relatively planar sides 152, 154, 156, giving the tube a polygonal cross-sectional shape. The planar sides 152, 154, 156 of the tube are not smooth, but are randomly crumpled, and adjacent planar sides are joined at respective vertices of the polygonal cross-sectional shape.

Lateral edge portions 47 of the sheet stock material are turned inwardly into the interior of the tube to form the tab 56 and are connected together and to outer portions 58 of the sheet stock material adjacent to and outside the tab 56 to form the ridge 60 disposed along one of the vertices. The ridge 60 may have a stiffness greater than the planar sides of the tube. The planar sides 152, 154, 156 of the tube may have substantially equal lengths, forming an equilateral triangular cross-section.

The present invention also provides a method for converting a sheet stock material into a relatively less dense dunnage product as the sheet stock material moves in a downstream direction. The method includes the following steps: (a) using a forming assembly to cause lateral side portions of the sheet stock material to roll towards one another to form the sheet stock material into a tubular shape with lateral edge portions of the sheet stock material being brought into juxtaposition, (b) using a forming channel at an outlet end of the forming assembly for receiving the lateral edge portions and shaping them into a tab that protrudes into an interior of the tubular shape, (c) using a deflector that engages the sheet stock material and urges the lateral edge portions into the forming channel for forming the tab; and (d) using a feeding assembly downstream of the forming assembly, the feeding assembly including rotating connecting members that engage and connect together the overlapping lateral edge portions of the sheet stock material forming the tab.

The shaping step may include gathering outer portions of the sheet material outside the tab inwardly against the tab and connecting the outer portions and the tab. The rolling step may include using a forming assembly to crumple the sheet stock material and to form the sheet stock material into the tubular shape. The method also may include at least one of (a) the engaging step including using a deflector within an external forming member to turn the sheet stock material toward an interior of the tubular shape; (b) the shaping step including using a forming channel at the downstream end of the forming assembly, facing the deflector for receiving the lateral edge portions and shaping the tab; and (c) the connecting step including drawing the tab between rotating connecting members.

In summary, the present invention provides a machine 30 for converting a sheet material 32 into a relatively less dense dunnage product 45 that includes a forming assembly 70 and a feeding assembly 76 downstream of the forming assembly 70. The forming assembly 70 is configured to cause lateral edges 46 of the sheet material 32 to roll towards one another, forming a tubular shape 54. A deflector 72 at a downstream end of the forming assembly 70 is configured to engage the lateral edges 46 of the sheet material 32 and to urge the lateral edges 46 into an interior of the tubular shape 54. This juxtaposes lateral edge portions 47 of the sheet material 32 adjacent the respective lateral edges 46. A forming channel 74 at a downstream end of the forming assembly 70 faces the deflector 72 for receiving the lateral edge portions 47 and shaping them into a tab 56. Finally, the feeding assembly 76 includes rotating connecting members 90, 92 that engage and connect together the overlapping lateral edge portions 47 of the sheet material 32 forming the tab 56.

Although the invention has been shown and described with respect to a certain illustrated embodiment or embodiments, equivalent alterations and modifications will occur to others skilled in the art upon reading and understanding the specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function (i.e., that is functionally equivalent), even though not structurally equivalent to the disclosed structure which performs the function in the herein illustrated embodiment or embodiments of the invention.

The invention claimed is:

1. A dunnage product made from a sheet stock material formed into a tube having at least three planar sides giving the tube a polygonal cross-sectional shape, where the planar sides of the tube are crumpled and adjacent planar sides are joined at respective vertices of the polygonal cross-sectional shape, and where lateral edge portions adjacent lateral edges of the sheet stock material are connected together to form a ridge disposed along one of the vertices, wherein each lateral edge of the sheet stock material is turned inward to form an inwardly extending tab, where each of the lateral edge portions includes the inwardly extending tab.

2. The dunnage product according to claim 1, wherein the ridge has a stiffness greater than the stiffness of those portions of the sheet stock material not forming the ridge.

3. The dunnage product according to claim 1, wherein each inwardly extending tab and an adjacent outer portion of the sheet stock material are crimped to form the ridge with the outer portions of the sheet stock material forming outer layers parallel to the inwardly extending tabs.

4. The dunnage product according to claim 1, wherein the polygonal cross-sectional shape is a triangle.

5. The dunnage product according to claim 1, wherein the sheet stock material includes at least one line of perforation extending transversely across the sheet stock material to separate a first portion of the tube from a second portion of the tube.

6. A dunnage product made from a sheet stock material formed into a tube, wherein the tube is formed by:

crumpling the sheet stock material while turning lateral edges of the sheet stock material inward;

forming at least three planar sides to give the tube a polygonal cross-sectional shape, where each of the planar sides of the tube are crumpled and adjacent planar sides are joined at respective vertices of the polygonal cross-sectional shape; and connecting together lateral edge portions of the sheet stock material to form a ridge that extends along one vertex of the polygonal cross-sectional shape;

turning each lateral edge of the sheet stock material inward to form an inwardly extending tab before the connecting step, where each of the lateral edge portions includes the inwardly extending tab.

7. The dunnage product according to claim 6, where the tube is further formed by crimping the sheet stock material at a junction between each inwardly extending tab and an adjacent outer portion of the sheet stock material to form outer layers parallel to the inwardly extending tab.

* * * * *